May 23, 1933. N. M. SALKOVER 1,910,968
METAL TREATMENT CONTAINER AND METHOD OF MAKING THE SAME
Filed June 24, 1931
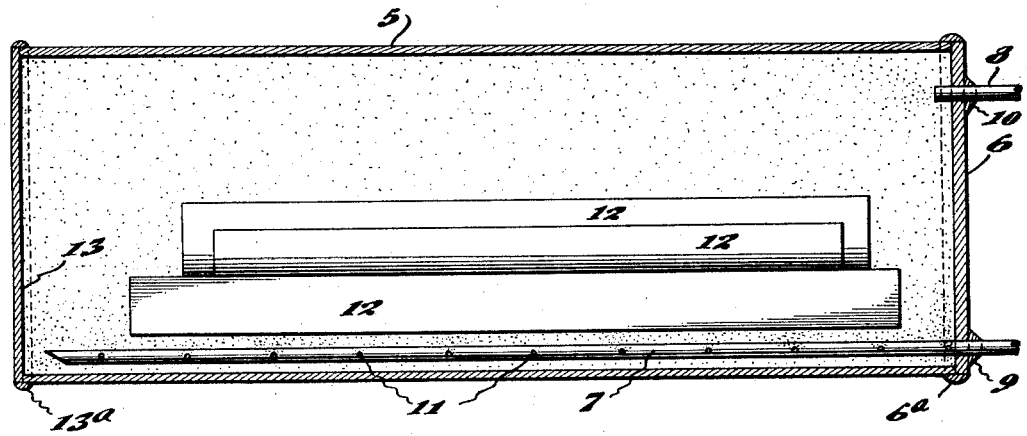
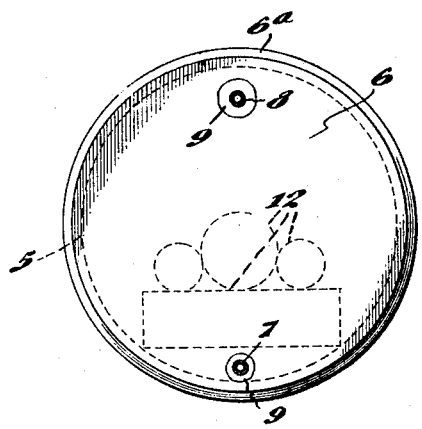
INVENTOR
Nicholas M. Salkover
BY
Wood & Wood ATTORNEYS Patented May 23, 1933

1,910,968

UNITED STATES PATENT OFFICE

NICHOLAS M. SALKOVER, OF CINCINNATI, OHIO, ASSIGNOR TO THE QUEEN CITY STEEL TREATING COMPANY, OF CINCINNATI, OHIO, A CORPORATION OF OHIO

METAL TREATMENT CONTAINER AND METHOD OF MAKING THE SAME

Application filed June 24, 1931. Serial No. 546,499.

This invention relates to an improved apparatus for and method of enclosing metal parts to be treated and is particularly directed to containers or retorts of the type used for enclosing parts for gas treatment, such as ammonia treatment, during the process known as nitriding or nitrogenizing. In this process, the parts to be treated are placed within a container and ammonia is delivered to and slowly fed through the container during or around the time in which the parts within the container are subjected to heat treatment.

Heretofore a great deal of difficulty has been encountered in providing a chamber for efficiently and properly enclosing the parts. Despite the use of a great many elaborate conventional sealing devices, no practical seal has been devised for the chamber which entirely prevents leakage of the ammonia which is used for the process. Moreover, further disadvantages with the equipment which has been used have been the extreme expense of construction and the elaborate and laborsome operations necessary each time parts were placed within the container and removed.

It is, therefore, the object of this invention to provide an improved container and method of constructing the same for the above purpose wherein there is no leakage of ammonia and wherein the apparatus and method of forming the same are vastly superior to the other methods because of greater economy in the time required to seal the container and the considerable reduction in parts and the extreme simplicity of construction. More particularly, the purpose is to provide a container including parts such as a main casing or body and covers which are joined together by fusion of the metals themselves as by welding or by some cementing metal, hard solders and brazes being possible means for joining the parts. The advantages derived from the fusion method of forming the container in a gas tight and sealed condition are that the operation is an extremely rapid one and there is a total elimination of arduous labor with the final result that the container is absolutely reliable in preventing the escape of ammonia during the process.

It is another object to provide a container which, after it is assembled, may readily be termed a one-piece structure since it is fused together, thereby either entirely eliminating distortion of the container and of the work within it or keeping the distortion to an absolute minimum. The temperatures used in the customary nitriding process, generally ranging between 800° F. and 1200° F. are not sufficient to break down or appreciably deteriorate welds or other fusion methods of sealing.

It is another object of this invention to provide an arrangement of the inlet for the ammonia whereby the ammonia is evenly distributed or released within the container. This perfect distribution throughout the container and about the parts is extremely important for good nitriding results.

Other objects and certain advantages will be more fully apparent from a description of the accompanying drawing, in which:

Figure 1 is a longitudinal sectional view of a container constructed under the method of this invention.

Figure 2 is an end view of the container.

The shape of the container depends entirely on the shape of work which is being treated and the amount of work which it is desired to treat at one time within a single container. The drawing, for this reason, is merely exemplary of the type of containers used, as to size and shape.

The main body of the container indicated at 5 is shown as a straight cylinder having open ends. This body is adaptable for disposition either in a horizontal position or a vertical position within the furnace during the heat treatment. As various possibilities, it may be rectangular in shape or the general shape may follow the shape of the work itself whether being treated collectively or singly. This container body has one end permanently closed by means of a cover plate or end disc 6 which is secured in place by welding or other fusion means as at 6ª, the scope of attachment means being extended to all forms which will not be effected by temperatures up to 1200° F. which are encountered during the heat treating and which is the environment in which the container is placed over long periods approximately anywhere from seven to one hundred and forty hours.

Since the end disc 6 is permanently fixed in place and is not disturbed after it has once been secured in position and in order to render the container convenient for a series of operations, the ammonia inlet tube 7 and outlet tube 8 are secured through this end cover and sealed in place. These tubes are fused in place as indicated at 9 and 10. The inlet tube extends within the container substantially over its entire length and has a plurality or series of minute perforations indicated at 11 disposed evenly along its length permitting ammonia to enter the container or retort throughout the entire length of the tube and to contact the work uniformly at all points.

After the parts which are indicated at 12 are placed within the container or retort and are suitably packed or arranged therein, an end closure disc 13 is temporarily welded or fused in place as at 13ᵃ in the same manner as the permanently fixed disc 6. The container or retort is then ready to place in the furnace for the nitriding or heat treating process. After the process is completed the end closure disc 13 is removed by means of a torch or otherwise.

By this construction, the initial and continued costs of processing parts are greatly reduced. Any sheet or plate container may be used, made of steel or other metals. The chief requisites are that all the joints be sound and that suitable provision be made for admitting and exhausting ammonia gas.

The limitations on the lightness of the gage of the material from which the container is made are that the container have sufficient strength and rigidity to withstand normal handling. The lid or cover which is welded in place after packing the container can be located anywhere, and may be of any shape. It is preferable to make the cover of lighter gage material than the container itself, particularly the cover which is removed during the operations, because of greater ease in handling the same during removal.

Although the drawing discloses the use of welding, it is to be observed that any method of joining the metals together as by fusion of the metals themselves, by the use of cementing metal or by the use of hard solders or brazes, are usable providing the joints are not effected by the heat treating temperatures. Due to the extreme low cost of the containers, it is possible to have on hand a large number of many different sizes. By being able to build a container to suit the job and the amount of work to be done, a great conservation in furnace space and reduction in ammonia consumption results. The containers may be discarded readily without any great financial loss when they become contaminated which it will be apparent is not possible in cases where an expensive equipment is used. The contamination greatly decreases the efficiency of the operation and the quality of the work and it is, therefore, important to limit the period of service of the equipment.

With the use of the fusion method for connecting the parts into a one-piece structure, it is possible in a minimum time, to obtain a seal which is absolutely tight, gaged by all practical standards. Since welding is a very rapid operation as well as the other fusion methods, no arduous labor is involved and the process is one of extreme simplicity and reliability. The only maintenance expense in using nitriding containers made in accordance with this invention is the very slight labor involved in welding or in applying any of the other fusion methods for fastening the lid to the container itself.

Since the final result placed in the furnace is an integral one-piece construction, distortion of the container and of the work within it is kept to an absolute minimum. It has been proven by tests that the temperatures of 840° F. to 1200° F. generally used in the nitriding process do not break down or deteriorate the welding or fusion of metal at the joints. The dependability and practically perfect efficiency of this sealing method has a very important bearing on the quality of the work produced. Practically without exception, all parts which are turned out are of a clean gray color which is considered desirable. The parts are of maximum hardness and their uniformity is substantially perfect. Moreover, by a perfect seal, ammonia leaks are prevented and ammonia consumption reduced to a minimum which is important since ammonia is one of the most serious cost items in the nitriding process.

Due to the provision of a gas tight container or retort for the parts to be treated, any type of gas, or more specifically, ammonia supply means may be used. The gas may be slowly delivered to the container and allowed to pass therethrough and exhaust through the outlet without any forcing pressure thereon, or it may be blown or forced through the container under the action of a fan, or it may be circulated, that is to say the same gas or ammonia may be passed in and out of the container under pressure sufficient for creating constant circulation in a circuit passing in and out of the tank. A gas supply means, apart from the inlet and outlet means, is not illustrated since it forms no part of this invention.

Having described my invention, I claim:
The method of subjecting metal parts to nitriding treatment comprising the following steps: placing the metal parts in a container having a large opening, fusing a closure plate in the opening, providing a gas inlet having delivery openings spaced uniformly throughout the length of the container and an outlet, introducing gas through the inlet, whereby the gas is uniformly distributed as it enters the container.

In witness whereof, I hereunto subscribe my name.

NICHOLAS M. SALKOVER.